United States Patent [19]

White et al.

[11] 3,810,182

[45] May 7, 1974

[54] ADAPTIVE ELECTRONIC HYBRID TRANSFORMER

[75] Inventors: Stanley A. White, Yorba Linda; Hubert L. Raper, Fullerton, both of Calif.

[73] Assignee: North American Rockwell Corporation, El Segundo, Calif.

[22] Filed: Aug. 12, 1971

[21] Appl. No.: 171,082

[52] U.S. Cl. .................................. 343/180, 325/22
[51] Int. Cl. ............................................. H04l 5/00
[58] Field of Search .................... 325/12, 17, 20–24; 343/180; 179/170 NO, 170 T, 170.6, 170.8

[56] References Cited

UNITED STATES PATENTS

| | | | |
|---|---|---|---|
| 3,696,429 | 10/1972 | Tressa | 343/180 |
| 3,699,444 | 10/1972 | Ghose | 325/21 |
| 3,540,049 | 11/1970 | Gaunt | 343/180 |
| 3,546,701 | 12/1970 | Kurth | 343/180 |
| 3,479,468 | 11/1969 | Kretzmer | 179/170 NC |
| 3,128,353 | 4/1964 | Gardner | 179/170.6 |

*Primary Examiner*—Albert J. Mayer
*Attorney, Agent, or Firm*—H. Fredrick Hamann; G. Donald Weber, Jr.

[57] ABSTRACT

The circuit is interposed between the transmitter and the receiver at one end of the transmission channel and correlates signals in a transmission channel with signals from the transmitter to adjust the gain and phase shift of the signal from the transmitter until the signal component in the transmission channel from the transmitter is filtered from the transmission channel signal so that only the receiver signal component is passed into the receiver.

9 Claims, 5 Drawing Figures

INVENTORS
STANLEY A. WHITE
HUBERT L. RAPER
BY Robert G. Rogers
ATTORNEY

INVENTORS
STANLEY A. WHITE
HUBERT L. RAPER
BY Robert G. Rogers
ATTORNEY

INVENTORS
STANLEY A. WHITE
HUBERT L. RAPER
BY
Robert G. Rogers
ATTORNEY

INVENTORS
STANLEY A. WHITE
HUBERT L. RAPER
BY Robert G. Rogers
ATTORNEY

INVENTOR

BY STANLEY A. WHITE
HUBERT L. RAPER

Robert G. Rogers
ATTORNEY

ADAPTIVE ELECTRONIC HYBRID TRANSFORMER

BACKGROUND OF THE INVENTION

It is well known that signals can be transmitted simultaneously in two directions on the same transmission line or channel. For example, signals representing data may be transmitted over transmission lines between data modems or the like, including transmitters and receivers. The transmitted signal from a local transmitter and the transmitted signal from a remote transmitter may be combined on the same transmission channel. Moreover, the local transmitter and the local receiver are connected to the same end of the transmission line or channel. Likewise, the remote transmitter and the remote receiver are connected to the same end of the transmission line or channel. At each transmitter location, the transmitter signal is larger than the received signal from the other transmitter location. Therefore, some means must be provided for preventing the signal component produced by the local transmitter (which is normally larger than the received signal from the remote transmitter) from entering the local receiver. In other words, the signal component from a transmitter at one location must be isolated from the signal being received by a receiver at the same location.

The filtering or isolating process is usually made more difficult because the transmission channel impedance is usually complex, i.e. it is comprised of resistive, capacitive, and/or inductive elements. Therefore, the channel, or load, impedance imparts phase shift, (lead or lag), and amplitude change to the transmitter signal component on the transmission channel. In a capacitive load, the transmitter signal is retarded or shifted backwards in phase (lag) and in an inductive load, the transmitted signal is shifted forward in phase (lead).

In order to cancel, or filter out, the transmitted signal component, the parameter changes such as phase shift and amplitude change must be cancelled or otherwise compensated.

Certain existing hybrid transformers and balancing networks provide isolation between transmitted and received signals. However the transformers do not work well unless the line characteristics are static or non-varying. If, as usual, the line characteristics change, the existing hybrid transformers fail to provide adequate signal rejection.

Isolation between receivers and transmitters is also provided (if the transmitted and received signals are of different frequencies) by analog bandpass, bandstop, high pass and lowpass filters. However, this approach is generally too limited in effect.

The adaptive electronic hybrid transformer comes close to the ideal performance goal of conventional hybrid transformers by a very different means of operation. Its name is derived from:

1. its performance goal to match the idealized performance of the conventional hybrid transformer;

2. its adaptivity to varying transmission line characteristics;

3. its use of active circuit components rather than passive components.

SUMMARY OF THE INVENTION

Briefly, the invention comprises a circuit connected to one end of a transmission channel and to the transmitter and receiver units associated with said one end of the transmission channel. The circuit isolates the transmitter signal component from the transmission channel signal thereby preventing this signal component from being passed into the receiver at the transmitter location. The transmission channel signal is summed with the transmitter signal. The summed signal is correlated with the transmitter signal in order to control for adjusting the parameters of the transmitter signal component of the transmission channel signal.

In the preferred embodiment, the phase and amplitude parameters of the transmitter signal component are adjusted by amounts equal and opposite to the phase and amplitude changes introduced into the signal by the complex impedance of the transmission channel. As a result, only the remotely generated receiver signal component is passed through the summer into the receiver.

The circuit may be described as an adaptive hybrid transformer which provides isolation between signals being simultaneously transmitted and received over transmission lines. The adaptive hybrid transformer provides a self-balancing electronic circuit for equalizing the effect of the varying load impedance that the transmission line presents to the transmitter.

DESCRIPTION OF PREFERRED EMBODIMENT

Figure 1:
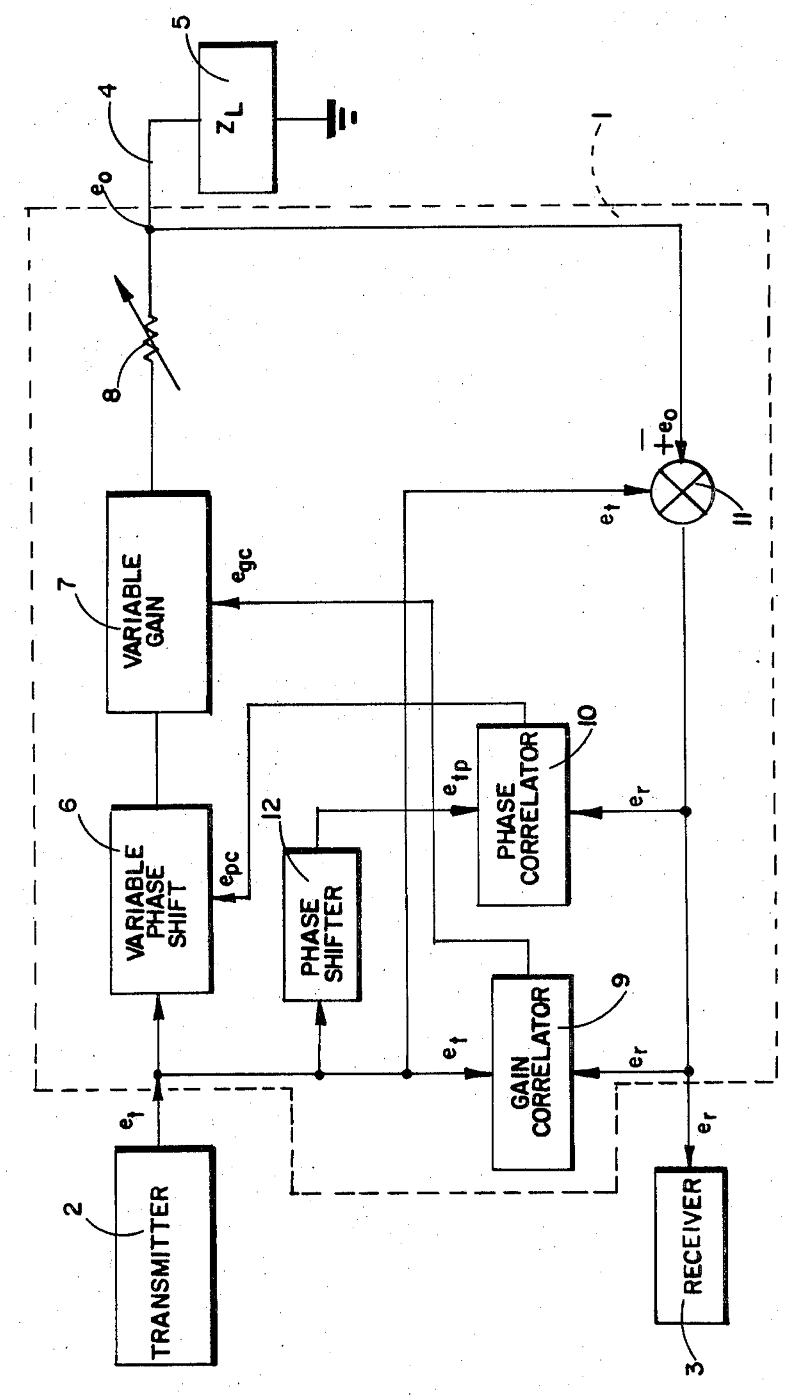
FIG. 1 is a block diagram of an adaptive electronic hybrid transformer circuit which isolates a transmitter signal component from a receiver at a particular location.

In this description, similar reference numerals are applied to similar elements.

FIG. 1 is a block diagram of an adaptive electronic hybrid transformer 1 connected between a transmitter 2, a receiver 3 and a transmission channel 4 represented by complex load impedance 5. Transmitter 2 and receiver 3 are associated with one end of the transmission channel. That is, transmitter 2 supplies a transmitted signal $e_t$ to channel 4 for reception at the other end thereof. Also, receiver 3 receives signals which have been transmitted by a transmitter at the other end of channel 4. The complex impedance 5 may represents resistive, capacitive, and inductive components (or parameters) include the remote transmitter and receiver at the other end of a transmission channel which varies the parameters (phase, amplitude) of the transmitter signal component of the transmission channel signal. Transmitter 2 and receiver 3 are believed well known to persons skilled in the art and for that reason additional details are not given.

The transformer 1 includes a variable phase shift circuit 6 which receives transmitter signal, $e_t$, from transmitter 2. The phase of the transmitter signal is adjusted as described subsequently and, in the embodiment shown, provides an input to variable gain circuit 7. The signal gain is adjusted also as described subsequently, and passed to the transmission channel 4 through isolation impedance 8. The transmission channel signal is identified as $e_o$.

The variable gain circuit 7 and the variable phase shift circuit 6 receive control signals ($e_{gc}$ and $e_{pc}$) from gain and phase correlators 9 and 10 respectively. The gain correlator 9 receives the transmitter signal $e_t$ from the transmitter 2 and a summed receiver signal, $e_r$, from the output of summer 11. The receiver signal is also supplied to the receiver 3.

The transmission channel signal $e_o$ has a transmitter signal component $e_t$ and a receiver signal component $e_r$. The transmitter signal component is usually different in phase, amplitude and the like from the receiver signal component. For example, phase and amplitude parameters of the receiver signal component may be increased or decreased due to the effects of the load impedance $Z_L$. As a result, when the signals are summed the signal, $e_r$, includes two components of the transmitter signal, viz the component due to the effect of $Z_L$ on the transmitter signal, $e_o$, and the transmitter signal $e_t$. When the transmitter component $e_t$ is filtered out, as described herein, only the receiver component $e_r$ is applied to the receiver 3. The receiver signal, as previously pointed out, is the signal transmitted from a remote location via channel 4.

The gain correlator 9 is connected between transmitter 2 and the output from summer 11. The transmitter signal $e_t$ is therefore, correlated with the transmitter signal component in $e_r$.

Phase shifter 12 is connected between transmitter 2 and phase correlator 10 to phase shift the transmitter signal $e_t$ to provide a quadrature component to the phase correlator. The correlator 10 also receives as an input signal the output signal $e_r$ from summer 11. The phase shifted signal $e_{tp}$ is thus correlated with the quadrature component of the transmitter signal in the $e_r$ signal.

It is pointed out that correlators are well known in the art. A correlator may be implemented by function generation techniques in combination with integration or summation circuitry. Generally a correlator is a detector which is sensitive to specified properties of one signal with respect to a second signal. The second signal is usually a reference. Typical correlators detect parameters such as phase, frequency, amplitudes, and the like. Classical correlators are defined by sums or integrals such as $$e_c(t) = \int_T^t f_1(e_1) f_2(e_2) dt \quad -\infty \leq T \leq t$$

or $$e_c(k) = \sum_{j=N}^{k} f_1[e_1(j)] f_2[e_2(j)],$$

where $e_c$ represents the output of the correlator, while $e_1$ and $e_2$ represent the two signals whose parameters are being correlated.

Figure 2:
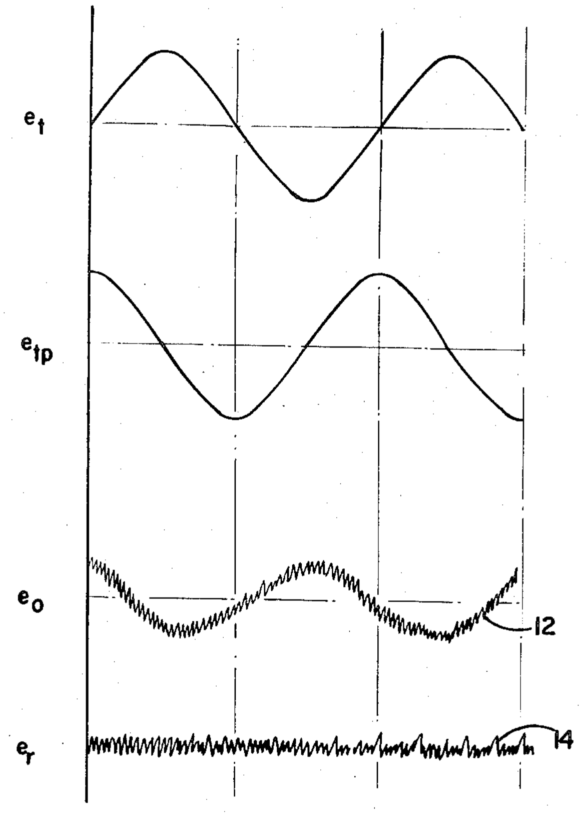
FIG. 2 is a diagram of the signals produced at selected points in the circuit shown in FIG. 1.

FIG. 2 is a diagram of the receiver signal, $e_r$, the transmitter signal, $e_t$, the phase shifted transmitter signal $e_{tp}$ and the signal on the transmission channel, $e_o$. For the example shown, the amplitude of the transmitter signal component is large relative to the receiver component. Therefore, the transmitter signal component from transmitter 2 must be removed before the signal reaches the receiver 3. The $e_r$ frequency is shown as higher than the $e_t$ frequency. However, in other examples, the frequencies of the two signals may be the same. Also, the relative amplitudes of the signals may be reversed.

The phase shifted transmitter signal, $e_{tp}$, is shown as having a phase lead of 90° relative to the transmitter signal. It is pointed out that phase shifter 12 may shift the phase of the transmitter signal by more or less than 90° so long as the phase shifted signal has a quadrature component relative to the transmitter signal $e_t$.

In operation, the signal $e_t$ from transmitter 2 and the signal transmitted from a remote location are combined on the transmission channel 4. The transmission channel impedance may be inductive, capacitive, resistive or combinations thereof. As a result, the amplitude and the phase shift of the transmitter signal component in the transmission channel signal can be shifted so that it either leads or lags the transmitter signal. Therefore, when the transmission channel signal $e_o$ is summed with the transmitter signal $e_t$ at summer 11 an error voltage represented by a component of $e_r$ results. The receiver signal $e_r$ is correlated by the gain and phase correlators 9 and 10 with the transmitter signal $e_t$ and the phase shifted transmitter signal $e_{tp}$. Assuming the amplitude of $e_t$ changed because of the impedance of the channel 4, (load impedance 5), a gain control signal, $e_{gc}$, is provided to the variable gain circuit 7. Assuming also the phase of transmitter signal changed because of the transmission channel impedance 5, phase correlator 10 simultaneously provides a phase control signal $e_{pc}$ to variable phase shift circuit 6.

The phase and amplitude of the local transmitter signal component $e_t$ of the transmission channel signal are adjusted $e_o$ by variable circuits 6 and 7 in response to signals from correlators 9 and 10 until the output of the summer 11 contains only the remotely generated transmitter signal component $e_r$ represented by signal 14 in FIG. 2.

Figure 3:
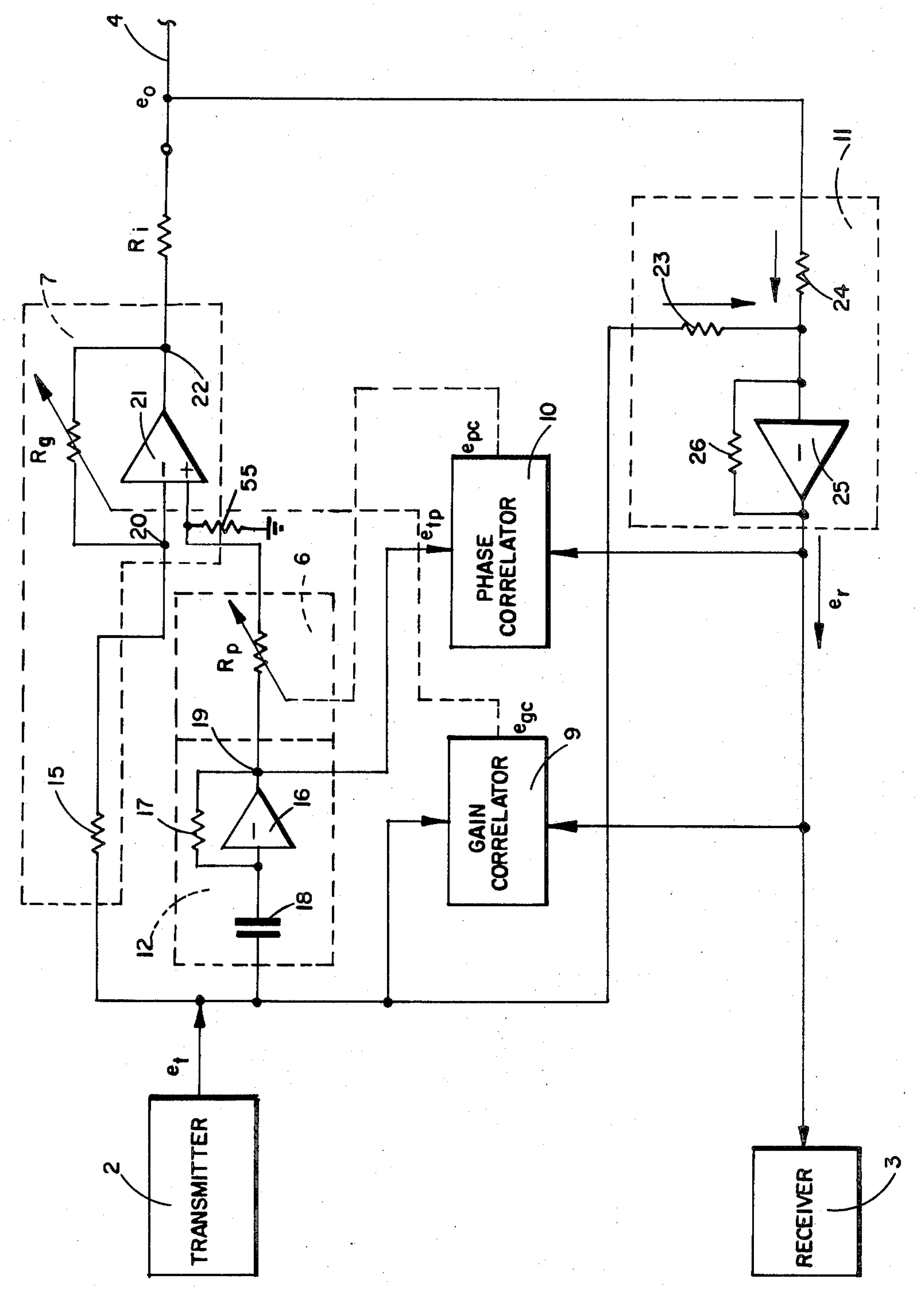
FIG. 3 is a schematic diagram of a specific embodiment of the variable phase shifted, variable gain and phase shift circuits shown in block diagram form in FIG. 1.

FIG. 3 is a schematic diagram of one embodiment of the adaptive hybrid transformer 1 shown in block diagram form in FIG. 1. The circuit illustrates an application where the load ($Z_L$) is capacitive. As a result, the transmitter signal component in the transmission channel signal, $e_o$, is retarded, i.e. lags in phase relative to the transmitter signal $e_t$. In addition, $e_o$ is initially at a maximum signal level due to the value of $R_g$ in the feedback circuit of amplifier 21.

The variable phase shift circuit 6 and phase shifter 12 are illustrated by amplifier 16, feedback resistor 17 connected around amplifier 16, input capacitor 18 connected between transmitter 2 and amplifier 16, and phase adjust resistor $R_p$. Amplifier 16 is adapted to produce phase inversion at output node 19. Ordinarily the positive (+) input (not shown) is connected to ground or a slight bias voltage level. For the particular embodiment shown, the capacitor and feedback resistor 17 produce a total phase shift of 90° through amplifier 16. The output signal at node 19, $e_{tp}$, is the transmitter signal shifted by 90°. In this case, the 90° phase shift imparts phase lag to the $e_{tp}$ signal. By reversing the roles or positions of resistor 17 and capacitor 18, a phase lead in the $e_{tp}$ signal can be produced. Of course, the phase shift need not be exactly 90° although this shift is desirable from an implementation standpoint. Node 19 is connected to one input terminal of phase correlator circuit 10.

As shown in FIG. 3, the variable phase shift circuit 6 uses the phase shifter circuit 12 and a phase adjust resistor, $R_p$. Resister $R_p$ is connected between node 19 and the positive i.e. (non-inverting) input to amplifier 21. It should be obvious that a separate circuit could be provided for the variable phase circuit 6 as shown in FIG. 1. The phase of the $e_t$ component of $e_o$ varies as a function of the value of resistor $R_p$ and load represented by resister 55 as defined hereinafter. The value of $R_p$ is controlled by the $e_{pc}$ signal from correlator 10. In some applications, another resistor may be connected from node 19 to node 20 in order to provide for phase lead or lag operations concurrently.

Variable gain circuit 7 includes resistor 15 which is connected from transmitter 2 to node 20. Node 20 is connected to the inverting input terminal of amplifier 21 which is operated as a differential amplifier with a feedback resistor $R_g$. Instead of using the positive (i.e. non-inverting) input terminal of amplifier 21, another amplifier could be connected between resistor 15 and node 20. In that case, resister $R_p$ could be connected to node 20. Resistor 55 is connected from the positive input to ground to form a divider network with resister $R_p$. The output signal from the amplifier 21 is supplied to the transmission channel 4 through the isolation resistor, $R_i$.

The gain of the operational amplifier 21 is controlled by the ratio of resistors 15 and $R_g$. The two resistors may be reversed and other circuit arrangements may be used to achieve gain of circuit 7 adjustment. The gain varies as a function of the adjustment of $R_g$ which is controlled by the $e_{gc}$ signal from correlator 9. The gain correlator 9 receives the $e_t$ signal as one input signal. Phase correlator 10 receives the quadrature transmitter signal $e_{tp}$. Both correlators receive the $e_r$ signal as input signals. One embodiment of gain and phase correlators is described subsequently relative to FIG. 4.

The following equations mathematically describe the operation of the FIG. 3 circuit. The load is assumed to be capacitive. Capital letters designate the Laplace transform of the signals, i.e. $E(s) = L[e(t)]$ and $s$ is the Laplace variable.

$$E_{22} = A_1E_t + E_tA_2s$$

$$= E_t(A_2s + A_1),$$

where $E_{22}$ i.e. $e_{22}$, $E_t$ is the Laplace transform of the voltage $e_t$ is the voltage at node 22, $A_1$ represents the gain factor of the amplifier 21 and $A_2$ represents the gain factor of amplifiers 16 and 21 in cascade. $A_1$ is dependent on the value of resistor $R_g$ and $A_2$ is dependent on the values of both resistors $R_g$ and $R_p$. The designator $s$ represents the circuit comprising differentiating action of the circuit comprising capacitor 18 and resistor 17 in conjunction with amplifier 16.

The $E_{22}$ signal is loaded by the impedance of the transmission channel 4 as indicated by the following equation:

$$E_o/E_{22} = R_L/R_L+R_i\ [1/(R_LR_iC_L/R_L+R_i)s + 1]$$

where $R_L$ and $C_L$ are load elements of line load impedance $Z_L$ and $R_i$ is the isolation resistor.

(Note: the remote transmitter signal component of $E_o$ has been omitted from the equations for simplification. It should be understood that the receiver signal component is present on that transmission channel). By substituting for $E_{22}$ the equation for $E_o$ becomes, $$E_o/E_t = (R_LA_1/R_L+R_i)\ [(A_2/A_1)\ s + 1/(R_LC/R_L+R_i)\ s + 1]$$

The variable phase shift circuit 6 and the variable gain circuit 7 are adjusted by the correlator circuits 10 and 9, respectively so that $R_LA_1 = R_L+R_i$ and $A_2/A_1 = R_LC_L/R_L+R_i$. As a result, $E_o$ is made equal to $E_t$.

In that case, the signals $e_o$ and $e_t$ are algebraically summed across resistors 23 and 24 at the input of operational amplifier 25. The $e_t$ signal component of the signal $e_o$ is, thus, eliminated and only the receiver signal component $e_r$ passes to the receiver 3. The amplifier 25 includes feedback resistor 26 so that it functions as an operational amplifier. In one embodiment, the amplifier has a gain of one. However, in other embodiments, the gain can be adjusted by changing the value of the feedback resistor 26 relative to the value of resistors 23 and 24. Resistors 23 and 24 are equal in the preferred embodiment, although, in general, their relative values can be varied.

As indicated above, summing network 11 provides passive cancellation of the currents generated by signals $e_o$ and $e_t$ at the junction of resistors 23 and 24. It does not require common-mode rejection in order to provide a summed output.

It is pointed out that the variable gain and variable phase shift circuits may be implemented by several types of circuits including analog and digital devices. In one embodiment, the circuits may be implemented by resistive elements which are light sensitive. The output from correlators 9 and 10 can vary the intensity of a light source for changing the resistance of resistors $R_p$ and $R_g$. Light emitting diodes may be used as the light source. Other circuits having resistances which can be varied independently of the gain and phase shift circuit can also be used.

It is further pointed out that the impedance of the transmission channel changes. However the correlator circuits 9 and 10 provide output signals for automatically equalizing the effects of the change on the channel signal, $e_o$. The circuit also self-adjusts for slight variations in the frequency of the transmitter signal. For example, for a capacitive load, the signal $e_t$ amplitude is slightly increased by series capacitor 18 in response to an increase in frequency. The amplitude is reduced in the same amount by the capacitive load which has a parallel capacitive element.

Figure 4:
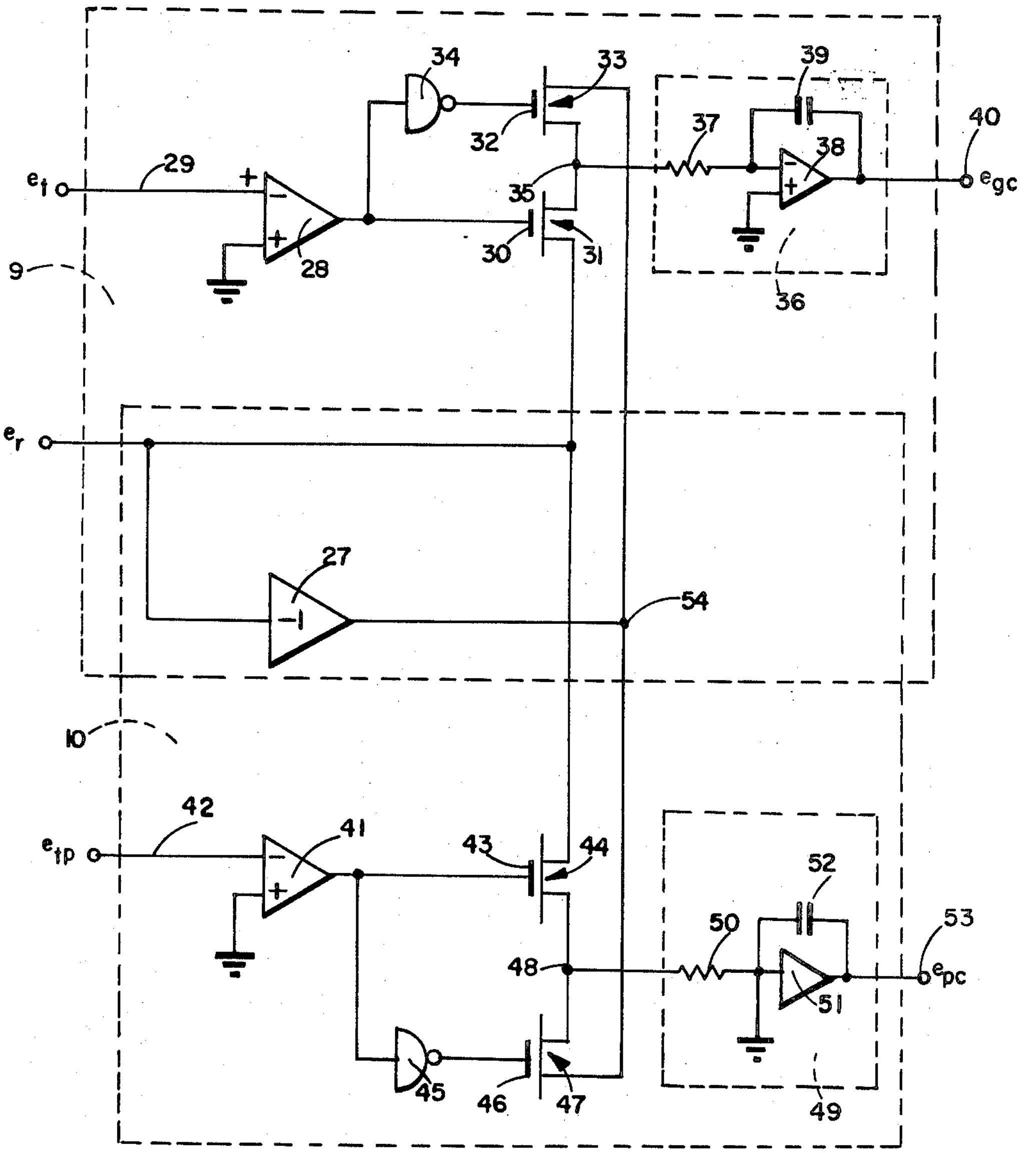
FIG. 4 is a schematic diagram of one embodiment of correlator circuits for adjusting the phase and amplitude of a transmitter signal component of a transmission channel signal as shown in block diagram form in FIGS. 1 and 3.

FIG. 4 is a schematic diagram of one embodiment of correlators 9 and 10. The embodiment illustrates a full wave circuit. By eliminating inverting amplifier 27 and grounding node 54, a half wave version can be implemented. It is also pointed out that FIG. 4 illustrates an analog circuit. Digital circuits can also be used to implement the correlators.

Gain correlator 9 includes amplifier 28 for inverting and shaping signal $e_t$ (by saturation) which is applied on line 29. The output terminal of amplifier 28 is connected to the gate electrode 30 of field effect transistor 31 and to the gate electrode 32 of field effect transistor 33 through inverting logic gate 34. One half cycle of the signal $e_r$ from summing network 11 (see FIGS. 1 and 3) passes through field effect transistor to node 35 during the positive half cycle of signal $e_t$.

Another half cycle of signal $e_r$ is inverted through amplifier 27 and passes through field effect transistor 33 to node 35 during the negative half cycle of $e_t$. Node 35 is the input node for integrator 36.

The integrator 36 includes input resistor 37, amplifier 38 and feedback capacitor 39 connected around amplifier 38. The integrator 36 integrates the signal at node 35 and provides an output signal $e_{gc}$ on terminal 40. This signal is supplied to variable gain circuit 7 to control the gain of the $e_t$ signal component in $e_o$.

In effect, amplifier 28 determines the sign of the $e_t$ signal and, then, by the use of transistors 31 and 33 multiplies the sign of signal $e_t$ by the amplitude of signal $e_r$. This product is then integrated. In a digital version, an accumulator comprising an adder and shift register circuit can replace the amplifier and transistors.

Gain correlator 10 utilizes circuitry which is substantially identical to the circuitry of correlator 9. Both correlators use amplifier 27 to supply an input signal thereto. The difference between the circuits is in the use of different correlating signals. That is, correlator 9 correlates signal $e_t$ with signal $e_r$ while correlator 10 correlates signals $e_{tp}$ (i.e. $e_t$ shifted by 90° as shown in FIG. 3) with signal $e_r$. Correlator 10 includes inverting amplifier 41 which inverts the $e_{tp}$ signal on line 42. Line 42 is connected to phase shifter 12 (see FIGS. 1 and 3). The output signal from amplifier 41 is supplied to gate electrode 43 of field effect transistor 44 and through inverting logic gate 45 to gate electrode 46 of field effect transistor 47.

The $e_r$ signal on successive half cycles of $e_{tp}$ is connected through field effect transistors 44 and 47 to node 48.

Node 48 provides an input terminal for integrator 49. Integrator 49 includes resistor 50, amplifier 51 and feedback capacitor 52. The integrator provides phase control signal $e_{pc}$ on terminal 53. The terminal 53 is connected to variable phase shift circuit 6 (see FIGS. 1 and 3).

Figure 5:
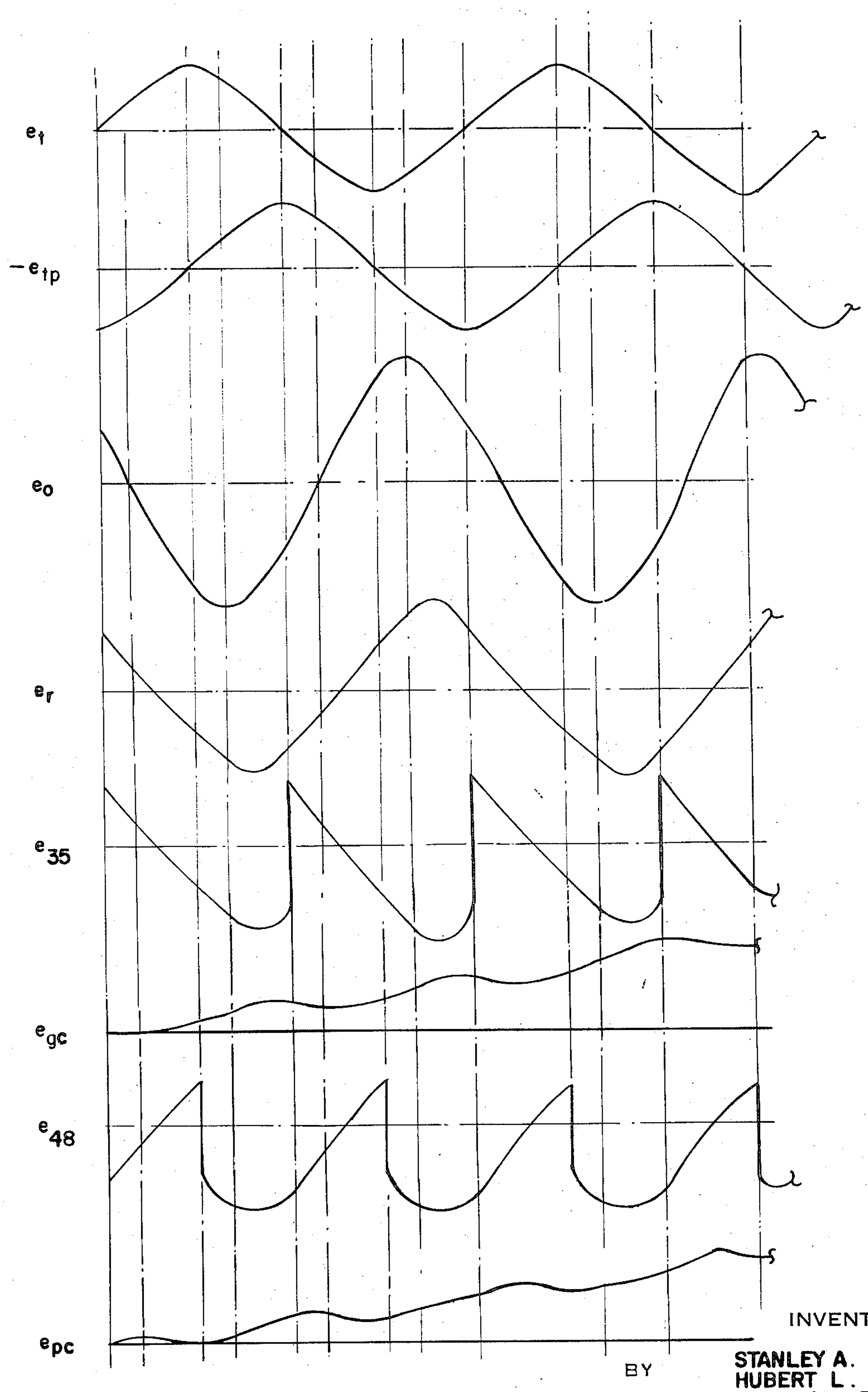
FIG. 5 is a diagram of the signals produced at selected points in the circuit shown in FIG. 4.

The operation of the correlator circuit can best be understood by referring to the signal diagram shown in FIG. 5.

In order to describe one operating example, the load is assumed to be capacitive. In addition, the gain circuit embodiment shown in FIG. 3 is used. A phase shift of 90° for $e_{tp}$ is also assumed. As a result, $e_t$ and $e_{tp}$ have the quadrature phase relationship shown in FIG. 5.

The transmission channel signal $e_o$ (excluding the receiver signal component — see FIG. 2) is shown inverted and with a phase lag of 30° relative to $e_t$.

The output from summer 11, viz. signal $e_r$, is the algebraic sum of signals $e_t$ and $e_o$. In effect $e_r$ is the transmitter signal component on the transmission channel plus local transmitter signal, plus the signal from a remote transmitter assumed to be zero here for simplifying the explanation.

During the positive half cycles of the $e_t$ signal, amplifier 28 inverts the signal and applies a negative voltage level to the gate electrode 30 of field effect transistor 31. The field effect transistor is turned on and the corresponding part of the cycle of the $e_r$ signal is applied to the input of integrator 36. The integrator input voltage during the $e_t$ half cycle is represented by the $e_{35}$ signal i.e. the signal at node 35.

During the negative half cycle of signal $e_t$, field effect transistor 33 is turned on by the signal applied to gate electrode 32 via amplifier 28 and gate circuit 34. The signal $e_r$ is inverted by amplifier 27 and applied to node 35, the input terminal of integrator 36, via transistor 33. Since $e_{35}$, at node has more negative area than positive area, the integrator produces a positive output signal $e_{gc}$ at terminal 40. This output signal continues to increase until the increased amplitude component of $e_t$ in the $e_o$ signal is cancelled. For the embodiment shown in FIG. 3, the resistance value of resistor $R_g$ is decreased to reduce the gain of gain circuit 7. When the $e_t$ component is filtered the $e_{35}$ signal goes to zero and the integrator output flattens as shown.

Similarly, the $e_r$ signal is provided to the input node 48 of integrator 49 during the positive half cycle of $e_{tp}$. During the negative half cycle of signal $e_{tp}$, signal $e_r$ is inverted and applied to the integrator. The signal at node 48 is shown in FIG. 5 as signal $e_{48}$. Since the negative area is greater than the positive area the integrator provides an increasing output signal $e_{pc}$ at terminal 53.

The output increases until the 30° phase shift imparted to the $e_t$ component in $e_o$, is compensated out. For the particular embodiment shown, the resistance value of resistor $R_p$ is increased to decrease the quadrature gain. When the phase of the $e_t$ component in $e_o$ is adjusted, the negative and positive half cycle values of signal of $e_{48}$ are equal and the integrator output signal flattens, as shown. When the phase and amplitude are adjusted, $e_{48}$, goes to zero.

Thus, there is shown and described an adaptive hybrid electronic transformer which is suitable for connection between the transmitter and receiver components associated with one end of a transmission line channel for isolating the transmitter and receiver. When the transmitter and receiver are isolated, the relatively large transmitter signal is prevented from being applied directly to the receiver at the same end of the transmission line. This type of isolation circuit is especially adaptable and usable in data MODEMS. Moreover, this type of circuit provides a relatively simple, selfbalancing electronic circuit for equalizing the effects of varying load impedance produced by standard transmission channel lines.

Circuits shown and suggested in the description and drawings are illustrative of a preferred embodiment only. Those skilled in the art will recognize that certain modifications can be made to this circuit without departing from the scope thereof. For example, the variable phase shift circuit and the variable gain circuit may be connected in parallel rather than in series in some applications.

These and other modifications to the subject invention which fall within the purview of the inventive concept described are intended to be included in this description. The scope of the invention is to be limited only by the appended claims.

Having thus defined a preferred embodiment of the invention, what is claimed is:

1. In combination, signal supplying means, signal receiving means, load means, signal controlling means connected between said signal supplying means and said load means, summing means connected to receive signals from said signal supplying means and from said signal controlling means where connected to said load means, and controller means connected between said summing means and said signal controlling means in order to control the operation of said signal controller as a function of the signal produced by said summing means, and said summing means connected to said signal receiving means to supply signals thereto which signals are substantially independent of the signals supplied by said signal supplying means.

2. An adaptive electronic hybrid transformer circuit to be interposed between a transmitter and a receiver, at the same end of a transmission line over which signals are being simultaneously transmitted and received, said transformer circuit comprising, a transmitter terminal;

a receiver terminal;

a line terminal;

summing means connected to said transmitter terminal and said line terminal for summing the signal applied at said line terminal from said transmission line with the transmitter signal applied at said transmitter terminal from said transmitter, said summing means connected to said receiver terminal for supplying a sum signal to said receiver, said signal from said transmission line including transmitter signal and receiver signal components;

detecting means responsive to said sum signal supplied by said summing means for detecting changes in parameters of said transmitter signal component, said detecting means including first circuit means for receiving said sum signal and said transmitter signal from said transmitter at said transmitter terminal in order to correlate the amplitude of the transmitter signal component in said sum signal supplied by said summing means with the amplitude of said transmitter signal from the transmitter and to generate an output signal representing the amplitude difference between the signals supplied thereto, and second circuit means for receiving said sum signal from said summing means and a signal representative of said transmitter signal from said transmitter in order to correlate the phase of said transmitter signal component in said sum signal supplied by said summing means with said transmitter signal and to generate an output signal representing the phase difference between said transmitter signal and said transmitter signal component in said transmission line signal;

phase shift means; and gain control means;

said phase shift means and said gain control means connected between said transmitter terminal and said line terminal, said first circuit means of said detecting means connected to said gain control means to control the operation thereof, said second circuit means of said detecting means connected to said phase shift means to control the operation thereof, whereby said phase shift means and said gain control means cause changes in the phase and amplitude of said transmitter signal component in the transmission line signal until said sum signal from said summing means represents the receiver signal component only.

3. The circuit recited in claim 2 wherein said gain control means includes amplifier means having at least an output terminal and an input terminal, and variable impedance means connected in a feedback path from an output terminal to a terminal of said amplifier, said variable impedance means coupled to and controlled by said first circuit means of said detecting means.

4. The circuit recited in claim 2 wherein said phase shift means includes amplifier means, and variable impedance means connected in series with said amplifier means, said variable impedance means connected to and controlled by said second circuit means of said detecting means.

5. The circuit recited in claim 2 wherein each of said first and second circuit means of said detecting means includes a pair of semiconductor devices having the conduction paths thereof connected in series, amplifier means having at least an input terminal and an output terminal, the input terminals of said amplifier means connected to receive said transmitter signal or said signal representative of said transmitter signal, the control electrodes of one of said semiconductor devices connected to the output terminal of said amplifier means, inverter means connected between said output terminal and the control electrode of the other one of said semiconductor devices, means for supplying said sum signal from said summing means and the inverse thereof to the opposite ends of the series connected conduction path of said semiconductor devices, and integrator means having the input terminal thereof connected to a common circuit point with said series connected conduction paths of said semiconductor devices, the output terminal of said integrator means connected to one of said phase shift means and said gain control means.

6. The circuit recited in claim 5 wherein said amplifier means are inverting type amplifiers, and said semiconductor devices are field effect transistors.

7. The circuit recited in claim 2 wherein said phase shift means and said gain control means adjust the phase and amplitude of the transmitter signal by an amount approximately equal and opposite to the phase and amplitude changes introduced into the transmitter signal by the complex impedance features of the transmission line.

8. The circuit recited in claim 2 including a phase shift circuit between said transmitter and said second circuit means for shifting the phase of said transmitter signal by approximately 90°.

9. The circuit recited in claim 8 wherein said first and second circuit means include first and second integrator circuit means respectively, said first integrator circuit means providing an output signal according to the expression $$\int_0^t e_r F(e_t)dt$$

where $e_r$ represents the signal from the summing means and $e_t$ represents the transmitter signal, and wherein said second integrator circuit means provides an ouput signal according to the expression $$\int_0^t e_r F'(e_{t\phi})dt$$

where $e_r$ represents the signal from the summing means and $e_{t\phi}$ represents said phase shifted transmitter signal.

* * * * *

PO-1050
(5/69)

UNITED STATES PATENT OFFICE
CERTIFICATE OF CORRECTION

Patent No. 3,810,182 Dated May 7, 1974

Inventor(s) White et al

It is certified that error appears in the above-identified patent and that said Letters Patent are hereby corrected as shown below:

Column 2, line 36, change "shifted" to --shift--.
Column 4, line 64, after "capacitor" insert --18--.
Column 5, line 37, which reads "used to achieve gain of circuit 7 adjustment. the gain" should read --used to achieve gain adjustment. The gain of circuit 7--;
lines 56 and 57, which read "where $E_{22}$ i.e. $e_{22}$, $E_t$ is the Laplace transform of the voltage $e_t$ is the voltage at node 22, $A_1$ represents" should read --where $E_{22}$ is the Laplace transform of the voltage at node 22, i.e. $e_{22}$, $E_t$ is the Laplace transform of the voltage $e_t$, $A_1$ represents the--;
line 62, delete "circuit comprising".
Column 7, line 6, after "transistor" insert --31--.
Column 8, line 10, after "node" insert --35--;
line 20, after "of" (second occurrence) insert --signal--.

Signed and sealed this 3rd day of December 1974.

(SEAL)
Attest:

McCOY M. GIBSON JR.
Attesting Officer

C. MARSHALL DANN
Commissioner of Patents